Dec. 24, 1935.  A. M. STARR  2,025,362
INTERNAL COMBUSTION ENGINE
Filed Oct. 21, 1932  4 Sheets-Sheet 1

INVENTOR.
Allan M. Starr
BY Ernest Sweetland
ATTORNEY.

Patented Dec. 24, 1935

2,025,362

UNITED STATES PATENT OFFICE 2,025,362

INTERNAL COMBUSTION ENGINE

Allan M. Starr, Piedmont, Calif., assignor, by direct and mesne assignments, to Starr Sweetland Corporation, Piedmont, Calif., a corporation of California

REISSUED
MAR 11 1941

Application October 21, 1932, Serial No. 638,866

6 Claims. (Cl. 123—32)

This invention relates to improvements in internal combustion engines and has for one of its objects an engine construction which utilizes the less volatile hydrocarbon fuels such as Diesel oil, and the various oils known in the trade as fuel oils, stove oil, distillate and the like, without sacrificing the speed, flexibility and light motor construction which makes an engine adaptable to the general automotive field including airplane requirements.

Another object is to provide an engine having a substantially constant air intake cycle, wherein the fuel may be throttled at will without restricting the amount of air entering the cylinder at each stroke. This is accomplished by my fuel injecting principle wherein I time the period of injection in accordance with the amount of fuel injected. This timing of the injection is so adjusted that varied amounts of fuel injected for different throttle positions are allowed to mix before ignition with substantially that portion of the air in the cylinder required to support the complete combustion of the amount of fuel injected. That is to say, at full throttle when it is desired to utilize all of the oxygen in the cylinder the injection occurs well in advance of ignition to allow time for turbulent distribution of the fuel with all the air in the cylinder, whereas at reduced throttle the fuel is injected just before ignition so that the small charge of fuel is mixed before ignition with only a small volume of air adjacent to the spark plug. By this means I obtain a constant air intake cycle and hence a high efficiency throughout the throttle range of the motor.

Another object is to provide an engine wherein the timing of fuel injection with reference to the position of the engine piston and the quantity of fuel injected at each stroke are automatically correlated.

Another object is to provide an engine of the fuel injection type wherein a portion of the residual heated gases of combustion are retained in a chamber adjacent to the cylinder without being exhausted during the scavenging stroke nor disturbed during the intake stroke of the engine. The hot gases thus entrapped supply a heated atmosphere through which each succeeding charge of fuel is injected, with the result that the atomized fuel charge is gassified (in part at least) and is thus prepared for explosion by the spark.

A further object is to provide an engine capable of utilizing non-volatile fuel oils and at the same time gain the advantages of electrical ignition, and consequently the high speeds unattainable with the Diesel type.

Another object is to provide an engine of light construction which is capable of utilizing non-volatile fuels but at the same time capable of starting without priming and without the assistance of auxiliary machinery other than the starting mechanism employed on ordinary automotive vehicle engines.

A further object is to provde an engine which by reason of its peculiar construction is less inclined to overheat than gasoline engines now in use and which therefore may more readily lend itself to air cooling.

Another object is to provide an engine head which is interchangeable with the engine head of any ordinary carburetor type of gasoline engine so that at nominal expense any gasoline engine can be converted so as to operate satisfactorily on a non-volatile fluid with a resultant increase in efficiency and economy.

A further object is to provide an engine suitable for automobile, airplane and motor-boat uses wherein the necessity of a highly volatile fuel is entirely eliminated and the great fire risk which prevails particularly in airplane and motor-boat installations is practically eliminated.

Another object is to provide an engine having a chamber capable of retaining heated gases between the strokes of the engine and having this chamber so equipped with a fuel injector and spark plug that atomized fuel is directed past the points of the spark plug and through the entrapped hot atmosphere and out the open end of the chamber into the cylinder space traversed by the piston.

Another object is to provide an engine capable of operating at higher compression ratios than carburetor type engines, without detonation.

Another object is to provide an engine which eliminates the need of a carburetor and its attendant parts and which therefore has a better volumetric efficiency. This is because in my construction there are no restricted carburetor passages to hinder the intake air flow and because of the absence of fuel vapor in the intake air charge. By increasing volumetric efficiency more power is obtained from a cylinder of a given size.

Referring to the drawings.

Figures 1, 2:
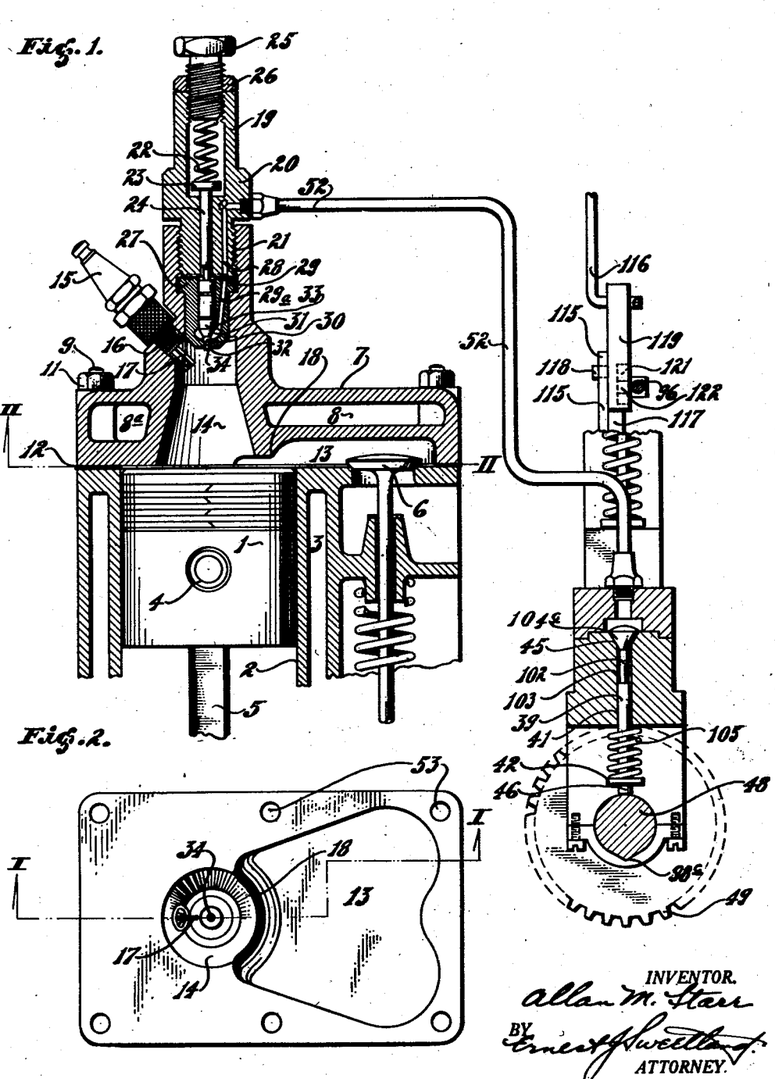
Figure 1 represents a vertical sectional view showing a part of the upper portion of an engine embodying one form of my invention together with a part of a fuel injection means for forcing fuel into the engine cylinder.
Figure 2 is an inverted plan view along the lines 2—2 of Figure 1.

Referring to the details shown in Figure 1, the numeral 1 indicates a piston which operates within the cylinder walls 2 which are cooled in the customary manner by water jacket 3. 4 is the wrist pin to which the connecting rod 5 is secured in the usual manner and this connecting rod is assumed to be associated with the usual crank shaft fly wheel and other parts commonly used in the internal combustion engine art. The valve 6 and its attendant parts are of the conventional construction employed in gasoline engines. One form of my invention as applied to the conventional L-head motor is illustrated in detail in the engine head of this figure wherein the head casting in general is represented by the numeral 7 which is cooled by the water jacket 8 and 8a, the head being secured to the cylinder block in the usual manner by means of the studs 9 and nuts 11 which pull the engine head tightly against the gasket 12. It will be noted that the engine head is recessed to form the space 13 which affords communication between the engine cylinder and the exhaust and air intake valves, one of which is shown in this view indicated by numeral 6.

An important feature of my invention resides in the chamber 14 which is formed in the head of the engine and which at its lower end is in open communication with the cylinder. The spark plug 15 is received in the threaded opening 16 and is provided with points 17 which are exposed within the chamber 14, and are preferably located at the very edge of the spray projected from nozzle 32. While the chamber 14 and the space 13 are in open communication with each other it should be noted that the casting is formed with a lip 18 which tends to deflect the air rushing into the cylinder through space 13 in a downward direction so that the incoming air produces the least possible disturbance to the gases entrapped in the chamber 14.

Surmounting the casting which forms the main head of the engine is the spring housing which is preferably of circular shape in its upper portion and hexagonal where indicated by the numeral 20 to permit it to be grasped by a wrench for assembly or removal and is secured to the head casting by the threads 21. The part 19 is hollowed out to receive the spiral compression spring 22 which bears against the flattened head 23 of rod 24. 25 is a hexagonal-headed screw to adjust the tension of the spring 22 and is held in place by the lock nut 26.

Figures 3, 4:
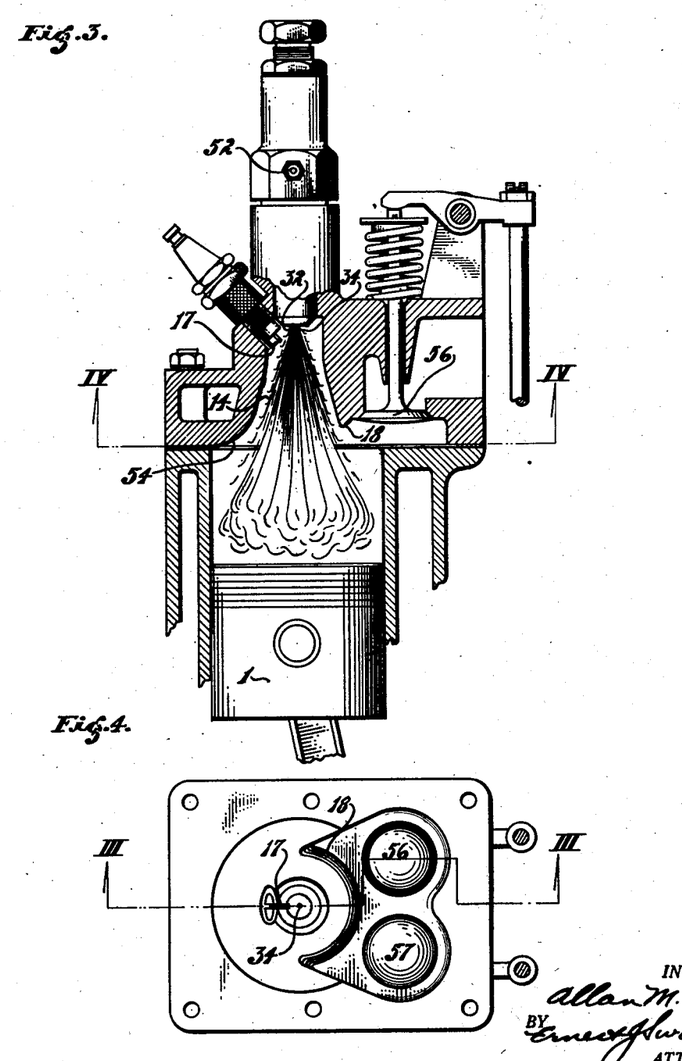
Figure 3 shows a vertical section of a portion of an engine of the overhead valve type wherein my invention is embodied.
Figure 4 is an inverted plan view along the lines 4—4 of Figure 3.

The part 19 securely holds the injector unit 27 in the position shown and in such manner that the fuel feed conduit 28 communicates with a groove 29 in the upper portion of injector unit 27 to deliver fuel through conduit 29a into the annular space 31 from which the fuel is injected through the pintle nozzle 32. The circular aperture formed in the axis of the injector unit is ground to receive the plunger 33 which is also ground and lapped to form a sliding fluid-tight fit within the body of the injector. At the lower end of the injector unit and integral therewith, and extending through the nozzle is a projecting tip or pintle 34 which is preferably the form of a truncated cone with its large end downward. The object of this flaring tip is to cause the atomized fuel to discharge in a suitable jet for properly disseminating the atomized spray to promote distribution within the cylinder, yet giving the spray such shape and direction that it will not impinge against the walls of the cylinder. The portion 30 of the plunger 33 is ground on its lower surface to fit against a ground seat at the inner end of the nozzle opening 32 and acts as a valve to keep the nozzle closed except during the instant when the plunger 33 is raised by the high oil pressure which is admitted by the opening of valve 104c. The angle of the pintle 34 may be varied to suit the size and shape of the chamber 14. For instance if the chamber 14 is made of a high and comparatively narrow design the nozzle 32 and the pintle 34 are so constructed as to project the fuel in a comparatively narrow spray but if the chamber 14 is of low wide construction, then the angle of the tip 34 is increased to give more spread to the projected spray. In Figure 3 the injector nozzle is represented in action to give a general idea of the manner in which the fuel is projected into the part of the cylinder traversed by the piston and thoroughly mixed with the air therein. The chamber 14 may be circular or oval in cross section or of other shape to carry out the objects of the invention, the spray nozzle being constructed so as to give a jet conforming to the shape of the chamber.

In Figure 1 the fuel is supplied by means of a pumping and metering system (not shown in this figure) which is assumed to deliver the liquid fuel under high pressure (say about 1,000 lbs. per square inch) to the annular space 103 which surrounds the valve stem 102, this valve stem being a continuation of the larger stem 39 which is a ground fluid-tight fit within the walls 41. At the lower end of this stem is a removable collar 42 which forms a seat for the compression spring 105 which maintains the ground valve 104c against the seat 45. The lower end of the valve stem 46 in its normal position just clears the surface of the cam 48 which is caused to rotate in proper timed relation with the engine by means of the gear 49. The cam 48 is provided with the lobe 98c which at the desired point of its revolution contacts with the stem 46 overcoming the oil pressure on the valve and the downward urge of the spring 105 and lifting the valve 104c off of its seat when the pressure on the fuel system forces the column of fuel upward through the conduit 52 through conduits 28 and 29 and annular chamber 31 when the high pressure of the oil against the lower end of the plunger 33 overcomes the pressure of the spring 22 causing plunger 33 to rise slightly when a jet of atomized fuel is very rapidly and forcibly projected through the nozzle 32. Thus a spray of finely atomized fuel is projected through the heated gases in the chamber 14 and on into the cylinder to be later ignited by the spark produced between the points 17 in accordance with the electrical timing of the engine which is substantially the same as the conventional timing for gasoline engines. The operation of the fuel injection system will be clearly understood by reference to the drawings and the description given further on.

Figure 2 which is an inverted plan view on the lines 2—2 of Figure 1, shows the chamber 14, the spark plug points 17 and the tip of the injector nozzle 34. It also shows the chamber 13 and the lip 18 which deflects the incoming air or gases entering the cylinder, the openings 53 being the holes through which the studs 9 pass to secure the head to the cylinder block of the engine. While Figure 2 for convenience represents the head of only one cylinder, it should be understood that ordinarily the casting 7 would extend the full length of the cylinder block and would be provided with a number of chambers and other parts corresponding with the number of cylinders in the engine.

Referring to Figure 3, this figure represents my invention as applied to the overhead valve type of motor and since the same principles would apply in the overhead valve construction as would be used in the L-head type just described, or in the T-head type of motor, the application of my invention to the overhead valve type of motor will be understood by those skilled in the art without repeating the description in minute detail. In this figure as in the foregoing ones, the body of the engine which may be of conventional type, as well as the exhaust manifold and other parts which have no direct bearing upon the invention, have been omitted. It is clear that the overhead valve construction requires less compression space about the valves than the L-head type. This enables an overhead valve motor to have more space in chamber 14 than an L-head motor of the same size.

The sleeve valve type of motor lends itself particularly well to my invention since all the compression space may then be utilized for chamber 14, but it has not been deemed necessary to illustrate the sleeve type motor in this application as the principles for applying my invention to the sleeve valve motor would be substantially the same.

In Figure 3 the piston 1 is represented as being in progress in its upward compression stroke and the fuel is represented as being discharged from the nozzle 32 in a conical jet which forms an angle within the chamber 14 such that it clears the walls of the chamber but flares outwardly so as to mix thoroughly with the charge of air which is rapidly being compressed while a turbulent mixture of the incoming fuel is being produced. A notable feature of the chamber 14, in the modified form ilustrated in this figure, resides in the curved flaring walls where the chamber unites with the space at the top of the cylinder as indicated at the point 54. I have found that the stream-line effect produced by curvilinear walls about chamber 14 have an advantageous effect and it is within the province of my invention to vary the curvature of the walls of the chamber 14 or to employ any angle of flare for these walls that may be best suited to carry out the objects of my invention.

While in Figure 3, as well as in Figure 2 I have illustrated the spark plug in a certain position with reference to the chamber 14, I do not limit myself to the particular position shown and it is within the scope of my invention to use more than one spark plug within each chamber if desired and to use such modified forms of spark plug or other electrical ignition apparatus as may be desired and to locate them in any position that will produce explosion of the charge by the passage of an electrical charge.

Figure 4 is an inverted plan view of the engine head represented in Figure 3 and taken along the line 4—4 thereof. In this figure the exhaust valve may be represented by the numeral 56 and the intake valve (not shown in Figure 3) by the numeral 57. The spark plug points are represented by the numeral 17 and the nozzle tip by 34.

Figures 5, 6:
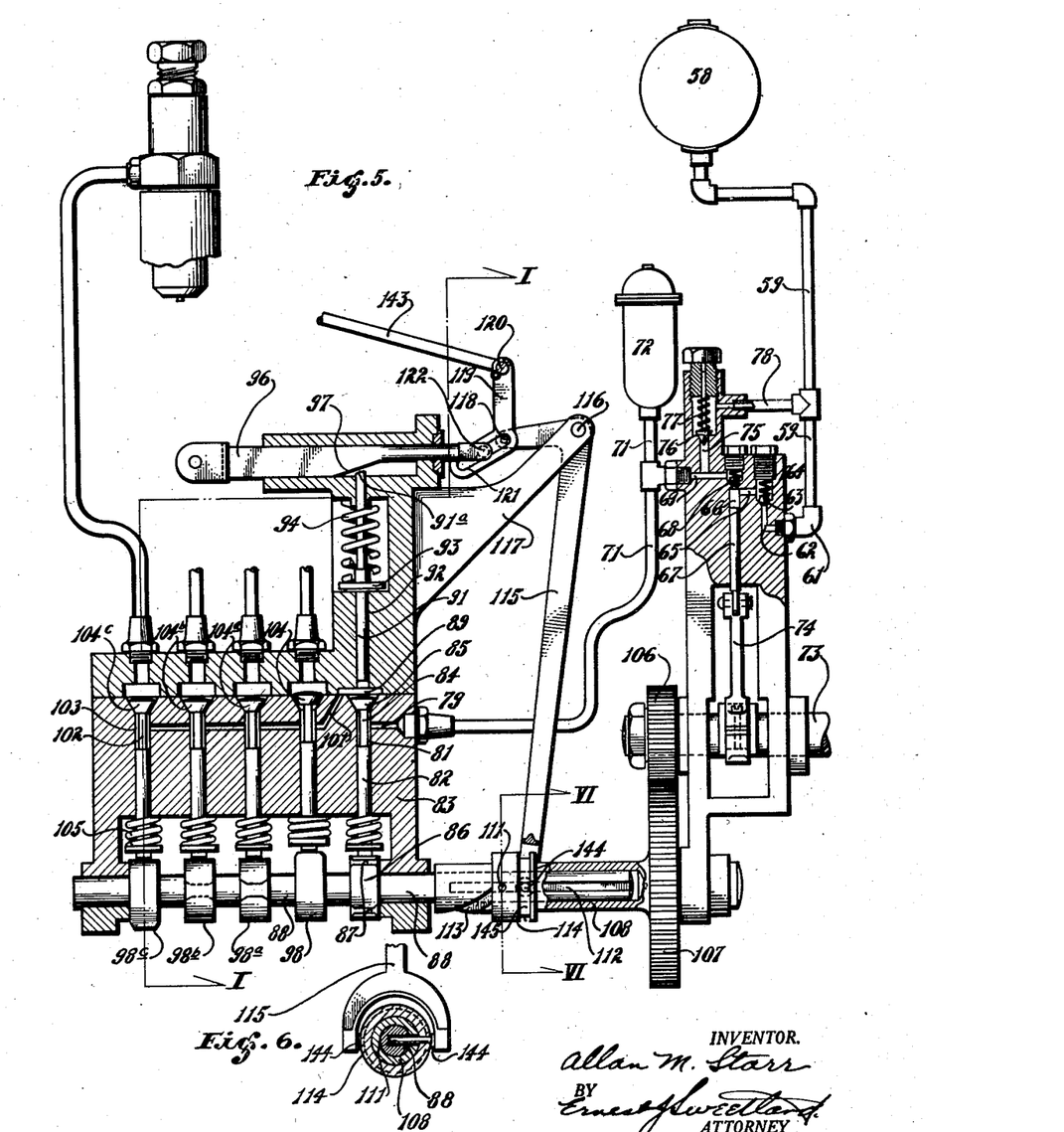
Figure 5 is an enlarged view of fuel system used in conjunction with the apparatus shown in the preceding figures.
Figure 6 is a view along the lines 6—6 of Figure 5.

Referring to Figure 5 this represents a fuel system I may employ in carrying out the objects of my invention. In this figure 58 represents a fuel supply tank from which the pipe 59 leads the fuel through the fitting 61 and conduit 62 past the ball valve 63 which is held on its seat by the spring 64, through conduit 65 into the pump cylinder 66. From here the fuel is forced by the piston 67 past the discharge valve 68 through conduit 69 into the pipe line 71 which at its upper end is provided with the fluid pressure bottle 72. This pressure bottle is designed to be maintained full of fuel at a high pressure, say about 1,000 lbs. per square inch, and the metallic walls of this bottle possess sufficient elasticity to act as a cushion and absorb the pulsations of the pump and maintain a uniform pressure on the lower end of the fuel line 71. The pump is driven by the shaft 73 and connecting rod 74 which may connect up with the engine crank shaft.

In order that the pressure of fuel may be kept within the bottle 72 the fuel pump is designed to pump a quantity of oil to supply the maximum requirements of the engine and when the motor is not carrying its full load the surplus fuel pumped discharges through the conduit 75 and valve 76 which is loaded by pressure of the compression spring 77 to maintain the desired pressure within the bottle 72 and the fuel pipe 71. After passing the valve 76 the surplus oil returns to the pump supply line 59 through pipe 78.

The fuel in line 71 passes through conduit 79 into the annular space 81 which is formed by the reduced diameter of the valve stem where indicated by the numeral 84. The lower part of the stem 82 is a ground and fluid-tight joint in the block 83 and at the extreme upper end of the stem is the valve 85 which is ground to a tight fit in a conical seat of the block as shown. The stem 82 is actuated by cam 86 which is provided with one lobe for each cylinder of the engine. In this instance there are assumed to be four lobes, two of which are indicated by the numeral 87. The revolution of the cam shaft 88 therefore lifts the valve 85 once for each shot of fuel required by the engine.

In order to provide the necessary adjustment in the quantity of fuel to meet the varying requirements of load and speed I provide the chamber 89 which is in open communication with the rod 91 which is ground and lapped to a sliding fluid-tight fit in the surrounding walls of the block 92. This stem is provided with a collar 93 against which the heavy compression spring 94 is seated. From this construction, it will be noted that the stem 91 is free to move in an upward direction when fluid enters the chamber 89 under sufficient pressure to overcome the pressure of the spring 94. When this occurs however the upward travel of the stem is limited by the position of the slide 96 which acts as a throttle by which the flow of fuel to the engine is governed. This slide is provided with an inclined surface 97 which acts as an abutment against which the upper end of the stem 91a strikes when the fluid pressure in the chamber 89 forces the stem 91 upward.

When the engine is idling at its lowest speed slide 96 would be in its forward position so that the slide would allow the stem 91a to move a very slight distance. When it is desired to speed up the engine then the slide 96 is retracted and the stem 91 is permitted a movement equal to the distance between the point 91a and the face of the inclined plane 97 which is opposite the stem. In this manner the amount of fuel which passes the valve 85 at each contact of the lobes 87 with the lower end of the stem 82 is definitely regulated by the position of the slide 96, or throttle as it may be called. Now when the valve 85 is lifted to admit a charge of fuel into the chamber 89 the stem 91 is caused to rise by the high pressure of the fuel and this stem bears against the fuel with a pressure equivalent to the force exerted by the spring 94 divided by the area of the stem 91. Thus a definitely measured charge of fuel is held under pressure in readiness to be discharged through the injector nozzle into a cylinder of the engine as soon as a valve leading to an injector nozzle is opened, at which time the spring 94 forces the stem 91 down to the limit of its travel forcing the oil charge into the cylinder.

Leading from the chamber 89 is the conduit 101 which connects chamber 89 with the annular spaces below the valves so that the annular spaces surrounding the valve stems as shown at 103 are maintained full of fuel in readiness to discharge through the injector nozzle when one of the valves such as 104, 104a, etc. is lifted from its seat. These valves are actuated by the cams 98, 98a, 98b and 98c respectively which cams have one lobe each positioned in accordance with the timing of the engine and carried by the cam shaft 88 upon which the four lobe cam 86 is also located. The four lobes 87 on the four lobe cam are timed between the lobes on the cams 98, 98a, 98b and 98c so that when valve 85 is open the valves 104, 104a etc. are closed and valve 85 again closes before a valve of the 104 series opens. With this arrangement it will be obvious that as the cams lift the valves as shown at 104 in their firing order a charge of fuel is released under sufficient pressure to lift plunger 33 and cause a forcible injection into each cylinder in its turn, it being understood that the compression springs 105 and the oil pressure above the valves are sufficient to hold the valves 104 firmly on their seats until they are lifted in their turns by the cams 98, 98a, 98b and 98c. One of the fuel injectors removed from the engine is shown in this figure, connected to the fuel system.

I may vary the fuel system in many ways. For instance the valves of the 104 series may be placed radially about a central cam or cams. Also, springs 105 may be located on the top of the valves instead of below them, or under certain conditions the springs may be omitted, for ordinarily the oil pressure on the top of the valves would keep them seated.

The fuel system is operated by shaft 73 which is assumed to be connected to the engine crank shaft. The gear 106 which is fixed to the shaft 73 causes the gear 107 to rotate and this gear which is provided with the hollow extended hub 108 imparts motion to the fuel system injector cam shaft 88 by means of the pin 111. Pin 111 makes this connection by its position in the straight groove 112 in shaft 88 and the helical slot 113 cut clear through the extended hub 108. With this connection it is possible to alter the angular position of shaft 88 with respect to the angular position of hub 108 while both are rotating, simply by sliding the pin 111 to or fro in its driving grooves 112 and 113. The pin 111 is secured rigidly in the rotating collar 114, so may be carried to or fro or held in position by collar 114 which in turn is slid to or fro by the forked arm 115 carrying pins 144 which ride in the groove 145 of collar 114. With this mechanism the timing of the fuel injecting system with respect to the position of the engine crank shaft can be changed at will while the engine is running. The arm 115 is pivoted by pin 116 and to the upper end of arm 115 is fastened the slotted link 119 by means of the pin 118 which projects from the side of link 119 and is opposite the end of slot 121 which is not cut clear through link 119. Link 119 is then pivoted on the end of arm 115 by pin 118 which projects from the unslotted surface of link 119. The rod 143 extends to the operator's control board where it can be set at any desired position. Moving the rod 143 rotates link 119 on the axis of pin 118 and this changes the angle made between slot 121 and the horizontal line of motion of slide 96. The throttle slide 96 carries the pin 122 which fits in the slot 121. The horizontal motion of pin 122 imparts a vertical component to the inclined slot 121, and since link 119 is held firmly by rod 143 it causes the arm 115 to rotate about pin 116 and move collar 114 which alters the injection timing. When the collar 114 is in its right hand position the injection begins at the end of the engine's compression stroke (retarded injection) and when the collar 114 is in its extreme left hand position the injection begins at the start of the engine's air intake stroke (advanced injection). Therefore moving slide 96 to the right, or reducing the amount of fuel injected, retards the beginning of injection while increasing the amount of fuel injected advances the beginning of injection. When the throttle is in idling position slide 96 is in its right hand position and pin 122 is in the end of slot 121 just opposite pin 118 and arm 115 is swung to retard the injection period and to make it practically simultaneous with the timing of the spark. Now if the rod 143 were moved there would be no consequent motion in arm 115 because link 119 would rotate about its pin 118 as well as the sliding pin 122. It will be noted that in this position the axis of pin 122 is on the axis of pin 118. Therefore the retarded position of the arm 115 is not changeable by rod 143 when the throttle is in idling position. Whenever pin 122 is moved by the throttle slide so that its axis is not on that of pin 118 (as shown in Figure 5) there must be a consequent motion in arm 115 the amount of which depends upon the extent to which slot 121 is inclined. It will be noted that the angle of inclination of slot 121 will determine the amount of motion in arm 115 resulting from a given movement of throttle 96. That is, if the slot 121 were horizontal the fuel injection system would remain with retarded timing regardless of the throttle position, and if the slot were inclined about as shown in Figure 5 the fuel injection system would be fully advanced at full throttle, and if the slot 121 were inclined just a degree or so the fuel injection system would be advanced a correspondingly small amount at full throttle.

In considering the movement of link 119 and arm 115 as produced by the pin 122 it should be remembered that when rod 143 is locked in position by ratchet 123 (Fig. 7) it may still swing about pin 144. To this extent rod 143 is always free to move, and it will be noted that it must so move when arm 115 is actuated by the throttle. This swinging motion of rod 143 will effect the movement of arm 115 produced by the throttle slide but only to a very slight degree. It is within the province of my invention to have slot 121 or the inclined surface 97 any curved shape as well as straight so that the timing of injection is suitable for any setting of the throttle, which is one object of my invention. In this way the desired control is obtained, whereby it is possible to make adjustments for various operating conditions so that any change in the throttle position will be accompanied by the most desirable change in the timing of the fuel injection.

The rod 143 is adjusted to give the best motor performance under various operating conditions. When starting a cold motor the full throttle is used with the injections occurring during the passing of the ignition spark (slot 121 is here set horizontal). Under these conditions I find that the heat of compression during the cranking of the engine is sufficient to enable the spark plug to ignite the charge to create at least a weak explosion, after which the hot gases from the explosion tend to volatilize succeeding charges of fuel and thus the operation continues. With a full throttle and low engine speed (lugging) the injection may be advanced to begin during some part of the compression stroke, while with a full throttle and high engine speed the injection may be advanced to begin during the air intake stroke. The type of fuel as well as the construction and compression ratio of the motor are also factors which determine the setting of rod 143. In general the more volatile the fuel, or the less its tendency to detonate, the further it may be injected in advance of its ignition.

A desirable characteristic found in the operation of this fuel system is that with the throttle set in a given position the amount of fuel delivered for each injection decreases as the engine speed increases and vice versa. The shape of the cams and the size of the valves and passages determine the degree to which the amount of fuel injected is affected by speed changes. The viscosity of the fuel also determines the extent to which speed changes alter the amount of fuel injected; and since fuels may vary in viscosity it is within the province of my invention to provide a needle valve 70 in line 71 to regulate the resistance which the system offers to fuel flow and thus maintain the proper relation for the change in the amount of fuel injected as a result of changes in speed.

Such a valve may be linked to the throttle mechanism or controlled by a governor for purposes of varying the resistance in the fuel line to meet special operating conditions.

It should be noted that the advance of timing of the injector mechanism which results in advance of timing of the actual injection as heretofore referred to has a dual purpose; one is to adjust timing of the injector to compensate for time lag, especially at high speed, and the other is actually to advance the period of injection with reference to the crank angle.

Figure 7:
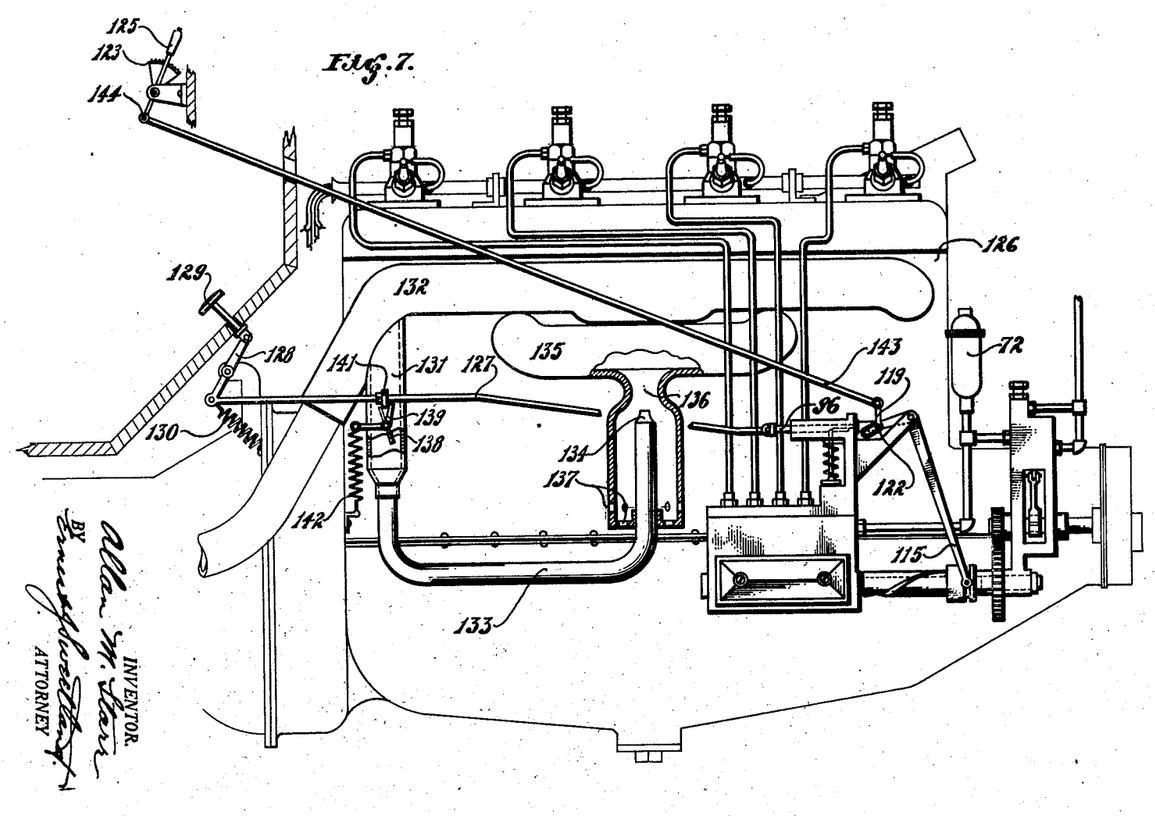
Figure 7 is a side elevation of an engine assembly wherein my invention is utilized.

Referring to Figure 7 a conventional engine block 126 is represented as being equipped with the head mechanism and fuel system which form the subject matter of this invention. A sufficient number of the parts shown in the drawings heretofore described have been marked with reference numerals corresponding to the numerals in the detail drawings to enable the parts to be readily identified. These drawings assume the engine to be installed in an automotive vehicle wherein the throttle slide 96 is connected by the rod 127 to the lever 128 which is controlled by the foot pedal 129 the spring 130 acting to return the throttle to the idling position whenever the pedal 129 is released. This figure illustrates a feature of my invention which I have found advantageous under certain conditions, namely that of diverting a portion of the exhaust gases back into the cylinders during the idling of the engine. I have found that under some conditions when the engine is idling very slowly the engine block tends to cool off to a greater extent than is desirable and that the condition is improved by letting some of the exhaust gases return to the cylinders in lieu of cold air. I accomplish this object by providing the branch pipe 131 which connects with the exhaust manifold 132 and leads into the intake manifold through the pipe 133 and nozzle 134 which is directed into the intake manifold 135 through an opening 136 where the heated gases mix with the outer air drawn into the intake manifold through the openings 137. While it may be desirable to return some of the heated gases while idling at slow speeds, it is not desirable to admit them into the cylinder when the engine is carrying much of a load. I have therefore arranged by the mechanism shown so that as soon as the throttle is slightly open and the engine given an increased fuel charge, the inflow of exhaust gases to the cylinder is automatically shut off. This is accomplished by means of the butterfly valve 138 which is here shown in open position. This valve is carried by a shaft to which is secured the bell crank 139 the upwardly extending arm of which is caused to bear against the collar 141 by means of the spring 142. Since the pedal 129 is pushed downwards to open the throttle this forces the rod 127 toward the left and the spring 142 closes the butterfly valve 138. Where it is desired to get the quietest and smoothest possible operation at idling speeds a butterfly valve may be placed in the air intake manifold and operated in conjunction with the throttle lever, similar to the manner shown in connection with valve 138. By this means the vibration caused by full compression at idling speeds is eliminated.

The perfect operation of my engine is attained by a combination of various related devices. The cylinder head construction provides the entrapped hot atmosphere through which each charge of fuel is sprayed before it is combusted. It is by this construction that my engine is capable of using the less volatile fuels successfully. The method of feeding fuel to the engine provides for correlation of the amount of each charge of fuel sprayed into the cylinder with the extent of the engine's piston travel during which the fuel is injected. It is by this method of feeding fuel in combination with my cylinder head construction that it is possible to attain the extensive speed range and high engine speed as well as the economy of the constant air intake cycle of my engine.

When the engine is to develop its full power the fuel is sprayed into the cylinder as the air is rushing in during the intake stroke and consequently all this air is uniformly mixed with the proper amount of fuel to completely combust with all this air drawn into the cylinder. An explosive mixture then completely fills the engine cylinder. When the engine is to run at a reduced throttle it is clear that there is more air in the cylinder than is required to combust the small fuel charge injected, and if this small amount of fuel were to mix with all this air the consequent mixture would be so lean that it could not explode. The fuel injection system of my engine at the time ignition is to occur has mixed or is mixing this reduced fuel charge with substantially that portion of the air in the cylinder required for the complete combustion of this particular quantity of fuel injected. My fuel injecting system accomplishes this by injecting this small fuel charge at a time which just precedes or is simultaneous with its ignition. For any throttle position the injection period is properly timed to allow the fuel to mix with the proper amount of air before combustion. While I have illustrated one means of correlating the fuel throttle with the injector timer, I do not limit myself to the arrangement shown for the same object may be carried out by various other arrangements of levers and cams, or by an arrangement of planetary gears to take the place of the helical slot 113 and its attendant parts.

It should be emphasized that my engine is capable of operating to advantage on gasoline or the like as well as the non-volatile fuel oils.

I do not limit myself to the precise constructions of cylinder head shown in the accompanying drawings. The central axis of chamber 14 may or may not be on the extended central axis of the cylinder bore as shown. Chamber 14 may be placed on one side of the top of the cylinder bore and inclined so that the fuel charge may be directed toward the center of the piston top. Chamber 14 may be of any shape conforming with the shape of the spray from any injecting nozzle. I prefer to have the volume of chamber 14 equal to at least one third of the total volume of the compression space.

The fuel nozzle may be of any construction that will atomize oil by the use of compressed air as well as the solid injecting principle shown. The spark plug may be of the present design or any modification thereof and I may combine the injector and properly arranged electrodes as a unit. If desired the electrodes may be arranged at the mouth of the fuel nozzle in such a way that the electric discharge passes directly through the fuel jet issuing from the injector. I may provide means outside the engine to adjust the position of the electrodes within the chamber 14, and it is within the province of my invention to provide such adjustment.

I am aware that various forms of antechambers have been used in connection with Diesel engines but the use of such chambers has been for purposes other than those herein described, and not for the purpose of entrapping heated residual gases to be utilized for heating an atomized spray of fuel during the unrestricted passage of such spray through the chamber into the displacement space of the engine well in advance of ignition by a spark.

I also am aware that whatever may be the shape of the compression space adjacent to an engine cylinder, such space contains hot gases not removed at the end of the exhaust stroke and also this space contains gases heated by compression at the end of each compression stroke, but the presence of these hot gases has no bearing upon the present invention. In the first place residual exhaust gases in an ordinary compression space are dissipated with the intake air rendering them ineffective for the purpose herein described. In the second place, gases heated by compression are hot only toward the very end of the compression stroke and hence are ineffective in carrying out the purpose of my invention.

With my cylinder head construction a hot atmosphere is continually present in chamber 14 which is essential in carrying out the objects of my invention. Even when the engine is running with a light load and the exhaust is relatively cool it should be noted that the explosions are localized in chamber 14 and the hot gases from each explosion tend to remain in this chamber while the cooler intake and exhaust gases flow in and out of the cylinder. Now if the engine is suddenly to carry a heavy load this hot atmosphere is present to heat a larger charge of fuel regardless of the engine piston's position when the injection begins. Since the gases in chamber 14 are hotter than the gases in an ordinary cylinder head before compression occurs it is obvious that after compression occurs the atmosphere in the upper end of chamber 14 will attain a temperature considerably higher than the temperature from compression in an ordinary cylinder head. It is the presence of this high temperature in the upper part of chamber 14 which enables the ordinary electrical ignition system efficiently to ignite fuel oil for all operating conditions in this engine.

In Figures 1 and 3 it will be noted that the fuel injecting nozzle and its attendant parts project to a certain extent into the chamber 14. This tends to cause considerable heat from the explosive gases to be transferred to the nozzle casing and the oil which it contains thus rendering the fuel more readily vaporized when it is sprayed in direct contact with the hot gases in the chamber 14. It is within the province of my invention to extend the protrusion of this nozzle into chamber 14 to any desired extent; in fact, I may so extend the nozzle casing into the chamber 14 that it is jacketed by the heated gases to a considerable extent. Whatever length or shape of injection nozzle I may employ I have found that it is always desirable to direct the nozzle toward the interior of the displacement part of the cylinder and not against the walls of the cylinder and its associated parts.

I reserve the right to apply the principles herein described to any type of motor to which they are applicable, such as the V type and the radial or rotary types etc. whether of the two cycle or four cycle design.

Where the term "throttle" is used throughout this specification it is intended to mean any device for varying the quantity of fuel fed to the engine and is not necessarily limited to the means herein set forth.

Where I use the term "hot gas chamber" I refer to a special chamber designed to entrap heated gases from the explosion of the engine and retain them in such manner that they are not discharged during the scavenging stroke of the engine, and so that they are not mixed to any great extent with the air which rushes into the cylinder during the intake stroke of the engine.

Where I use the term "compression space" I refer particularly to the space adjacent to the engine cylinder wherein gases are compressed when the piston is at the top of its stroke.

By "displacement part" of a cylinder I mean that part of a cylinder which is traversed by the piston as distinguished from space in the upper portion of the cylinder that is not reached by the piston in its normal travel.

When I use the term "non-volatile" fuel I mean a fuel that does not evaporate rapidly at normal atmospheric temperatures as distinguished from volatile fuels such as gasoline or alcohol.

Where I use the term "electrical ignition" I mean ignition from periodic electrical discharges such as those which cause sparks and in no way do I mean ignition from a wire heated by a continuous electrical flow.

Having thus described my invention what I claim is:

1. An internal combustion engine including a cylinder head, a cylinder and piston, an elongated combustion chamber in said cylinder head, an inlet passage in said head leading downwardly and directly into said cylinder, said inlet passage being adjacent said combustion chamber and separated therefrom by a partition member constructed with a deflecting lip to direct the incoming air charge into the engine cylinder and away from the combustion chamber, said combustion chamber having communication with said cylinder and having a quiescent zone in the end remote from said cylinder wherein a minimum of turbulence is produced, an injector nozzle and electrical ignition means in said zone, said nozzle being positioned to direct its spray adjacent said ignition means within said zone and substantially toward said cylinder and piston.

2. An internal combustion engine construction comprising a cylinder and a cylinder head, an elongated combustion chamber in said cylinder head, a quiescent zone formed in the portion of said combustion chamber most remote from said cylinder, a fuel injection nozzle in said chamber located to direct a spray of fuel through said quiescent zone and chamber and substantially toward said cylinder, a spark mechanism in said chamber having a spark gap adjacent the opening in said nozzle, a downwardly-leading air intake passage formed in said cylinder head adjacent said combustion chamber, a partition member in said cylinder head between said combustion chamber and said air intake passage having a portion which serves to deflect the incoming air away from said combustion chamber and toward said cylinder.

3. An internal combustion engine construction comprising a cylinder and a cylinder head, an elongated substantially vertically disposed combustion chamber in said head, said chamber being of reduced cross-sectional area at the end most remote from said cylinder and gradually increasing in cross-sectional area toward said cylinder, an injector nozzle located to direct a spray of fuel through said combustion chamber toward said cylinder, a spark plug in said chamber having a spark gap adjacent the outlet of said nozzle, a downwardly-leading air intake passage in said cylinder head adjacent said combustion chamber, a downwardly opening air valve to control said passage, a partition member in said cylinder head between said combustion chamber and said air intake passage having a portion which serves to deflect the incoming air away from said combustion chamber and toward said cylinder.

4. An internal combustion engine including a cylinder head, a cylinder and piston, a combustion chamber in said cylinder head, said combustion chamber being elongated upwardly and having its walls converging toward the end most remote from said cylinder to produce a quiescent zone of comparatively little turbulence at the end of said chamber most remote from said cylinder, a fuel injection nozzle in said quiescent zone located to direct a spray of fuel through said quiescent zone and combustion chamber substantially toward said cylinder, a spark gap in said quiescent zone adjacent said nozzle, a downwardly-leading air intake passageway in said cylinder head, separating means between said air intake passageway and said combustion chamber, said separating means including a lip member acting to deflect the intake air downwardly into said cylinder and prevent said intake air from directly entering into said combustion chamber.

5. An internal combustion engine including a cylinder head a cylinder and piston, intake and exhaust passageways in said cylinder head, engine-timed valves mounted in said cylinder head to control said passageways, a combustion chamber in said cylinder head, said chamber being elongated upwardly to provide a quiescent zone in the end thereof most remote from said cylinder, a fuel injection nozzle in said quiescent zone located to direct a spray through said quiescent zone and combustion chamber substantially toward said cylinder, a spark gap in said quiescent zone adjacent said nozzle, the said air intake passageway leading downwardly through said cylinder-head into said cylinder, and being separated from said quiescent zone and said combustion chamber by a wall having a deflecting lip which deflects the incoming air downwardly into said cylinder and prevents direct entrance thereof into said combustion chamber and said quiescent zone.

6. An internal combustion engine construction comprising a cylinder and a cylinder head, an elongated combustion chamber in said head, said chamber being of reduced cross-sectional area at the end most remote from said cylinder, an injector nozzle located to direct a spray of fuel through said combustion chamber toward said cylinder, a spark plug in said chamber having a spark gap adjacent the outlet of said nozzle, a downwardly leading air intake passage in said cylinder head adjacent said combustion chamber, a downwardly opening air valve to control said passage, a partition member in said cylinder head between said combustion chamber and said air intake passage having a portion which serves to deflect the incoming air away from said combustion chamber and toward said cylinder.

ALLAN M. STARR.